United States Patent
Salsbury et al.

(10) Patent No.: US 12,556,273 B2
(45) Date of Patent: Feb. 17, 2026

(54) OPTICAL COMMUNICATION SYSTEM USING DIFFRACTION GRATINGS AS A DIRECTIONAL FILTER

(71) Applicant: Honeywell Limited Honeywell Limitée, Mississauga (CA)

(72) Inventors: Marc Salsbury, Gloucester (CA); Alan Scott, Guelph (CA)

(73) Assignee: Honeywell Limited Honeywell Limitée, Mississauga (CA)

( * ) Notice: Subject to any disclaimer, the term of this patent is extended or adjusted under 35 U.S.C. 154(b) by 295 days.

(21) Appl. No.: 18/507,467

(22) Filed: Nov. 13, 2023

(65) Prior Publication Data

US 2025/0158709 A1   May 15, 2025

(51) Int. Cl.
*H04B 10/11* (2013.01)
*G02B 5/18* (2006.01)

(52) U.S. Cl.
CPC ........... *H04B 10/11* (2013.01); *G02B 5/1819* (2013.01)

(58) Field of Classification Search
None
See application file for complete search history.

(56) References Cited

U.S. PATENT DOCUMENTS

| 5,016,951 A | 5/1991 | Deason et al. |
|---|---|---|
| 6,782,207 B1 | 8/2004 | Efimov |
| 7,248,617 B2 | 7/2007 | Volodin et al. |
| 7,646,950 B2 | 1/2010 | Park et al. |
| 2002/0015546 A1 | 2/2002 | Bhagavatula et al. |
| 2007/0086703 A1* | 4/2007 | Kirk .................. G02B 6/12007 385/24 |

FOREIGN PATENT DOCUMENTS

| CA | 2564658 A1 | 4/2007 |
|---|---|---|
| EP | 4258571 A1 | 10/2023 |
| JP | 3978078 B2 | 9/2007 |
| KR | 10-2217904 B1 | 2/2021 |
| WO | 2004005993 A1 | 1/2004 |

OTHER PUBLICATIONS

Extended European Search Report in EP 24207914.3 dated Mar. 17, 2025.

* cited by examiner

*Primary Examiner* — David W Lambert

(57) ABSTRACT

An optical communication system is provided with a sequence of diffraction gratings interposed between an external signal pathway and both an internal transmitting unit and an internal receiving unit. A plurality of diffraction gratings arranged into the sequence define a reciprocal optical directional filter. The diffraction gratings, transmitting unit, receiving unit and external signal pathway are arranged such that the transmitted signals from the transmitting unit are transmitted through the sequence of gratings to the external signal pathway based on the wavelength and angle of incidence of the transmitted signals and the received signals from the external signal pathway are transmitted through the sequence of gratings to the receiving unit based on the wavelength and angle of incidence of the received signals. The gratings can be volume Bragg gratings formed within a solid transparent volume interposed between the external signal pathway, the internal transmitting unit and the internal receiving unit.

20 Claims, 5 Drawing Sheets

OPTICAL COMMUNICATION SYSTEM USING DIFFRACTION GRATINGS AS A DIRECTIONAL FILTER

FIELD

The present disclosure relates to free-space optical (FSO) communication systems, and in particular, to an optical communication system that uses diffraction gratings as a directional filter.

INTRODUCTION

The following is not an admission that anything discussed below is part of the prior art or part of the common general knowledge of a person skilled in the art.

Free-space optical (FSO) communication systems enable communication between spaced-apart communication terminals such as orbiting satellites and ground terminals. The FSO link often spans thousands, or tens of thousands of kilometers. To cover such expansive distances, a communication terminal must generate a powerful transmit optical signal (i.e. a laser) through free space such that the signal reaches its intended destination with sufficient intensity to transfer data with low error rates. The same communication terminal may also receive signals from other terminals. In many cases, the received signal is a much weaker signal owing to the large distances between terminals.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Free-space optical communications systems can provide point-to-point communication coverage between systems located across the planet and in airborne locations or in space. To facilitate communications over large distances, networks of communication terminals (e.g. satellites) can be used to route communications. Each communication terminal can be arranged to transmit optical signal to, and receive optical signals from, one or more other communication terminals that are spaced apart over free space (e.g. through air or space). Accordingly, each communication terminal must include optics that allow the transmit and receive channels to be separated. This presents challenges in terms of ensuring interoperability between communication terminals that may be transmit optical signals with different wavelengths and/or polarization. Furthermore, it is important to ensure that the received signals are not overwhelmed by the typically much stronger transmitted signals output by a communication terminal. Some applications such as space-based and airborne communication terminals also introduce complications relating to size, weight, power consumption, and reliability that further constrain the design and development of the optics used to separate the transmit and receive channels.

In accordance with this disclosure, an optical communication system can be provided with an optical directional filter that is implemented using diffraction gratings. A plurality of diffraction gratings can be interposed between an external signal pathway and both the internal transmitting unit and the internal receiving unit. The diffraction gratings, transmitting unit, receiving unit, and external signal pathway can be arranged such that the transmitted signals from the transmitting unit are transmitted through the sequence of gratings to the external signal pathway based on a first angle of incidence of the transmitted signals and the received signals from the external signal pathway are transmitted through the medium to the receiving unit based on a second angle of incidence of the received signals. The diffraction gratings can thus be tuned to optically isolate the transmitting and receiving pathways based on the angle at which optical signals are incident on the sequence of diffraction gratings.

Using a sequence of diffraction gratings as the optical filter can reduce the size and weight of the directional filter onboard a communication terminal. This also provides a fixed/static directional filter that omits moving parts while being capable of separating the transmit and receive channels. This, in turn, can obviate the need for electronic or control systems to adjust the filter in order to separate the signal channels. This can simplify manufacturing and increase the longevity and reliability of the filter components.

In an aspect of this disclosure, there is provided an optical communication system, comprising: a transmitting unit coupled to an optical transmitting pathway; a receiving unit coupled to an optical receiving pathway; an external optical assembly unit coupled to an external optical pathway; and a sequence of diffraction gratings coupling the optical transmitting pathway and the optical receiving pathway to the external optical pathway, wherein the sequence of diffraction gratings comprises a plurality of diffraction gratings, wherein the plurality of diffraction gratings comprises a first subset of diffraction gratings adapted to transmit a transmitted signal received at a first side of the sequence from the transmitting unit through a second side of the sequence to the external optical assembly unit and a second subset of diffraction gratings adapted to transmit a received signal received at the second side of the sequence from the external optical assembly to the receiving unit.

The plurality of diffraction gratings can be fixed in position between the transmitting unit, the receiving unit, and the external optical assembly unit.

The transmitting unit can be arranged to transmit the transmitted signal to the first side of the sequence of diffraction gratings at a first angle of incidence; and the external optical assembly can be arranged to transmit the received signal to the second side of the sequence at a second angle of incidence, the second angle of incidence being different from the first angle of incidence.

The optical transmitting pathway can be offset from the optical receiving pathway by at least 45 degrees.

At least some of the diffraction gratings in the first subset of diffraction gratings can be adapted to transmit a different wavelength.

At least some of the diffraction gratings in the second subset of diffraction gratings can be adapted to transmit a different wavelength.

The plurality of diffraction gratings can be a plurality of volume Bragg gratings and the plurality of volume Bragg gratings can be formed within a solid transparent volume interposed between the optical transmitting pathway, the optical receiving pathway and the external optical pathway.

The solid transparent volume may be a single optical block and all of the volume Bragg gratings in the plurality of volume Bragg gratings can be formed within the single optical block.

The solid transparent volume may be an optical stack that includes a plurality of optical blocks stacked together, and each optical block of the plurality of optical blocks can have at least one of the volume Bragg gratings in the plurality of volume Bragg gratings formed within that optical block.

In an aspect of this disclosure, there is provided an optical directional filter for an optical communications system, the filter comprising: a sequence of diffraction gratings, wherein the sequence of diffraction gratings comprises a plurality of diffraction gratings, wherein the plurality of diffraction gratings comprises: a first subset of diffraction gratings adapted to transmit a transmitted signal from a transmitting unit to an external optical assembly unit according to a first angle of incidence of the transmitted signal; and a second subset of diffraction gratings adapted to transmit a received signal from the external optical assembly to a receiving unit according to a second angle of incidence of the received signal; wherein the first angle of incidence is different from the second angle of incidence.

The plurality of diffraction gratings can be a plurality of volume Bragg gratings and the plurality of volume Bragg gratings can be formed within a solid transparent volume.

The solid transparent volume can be a single optical block and all of the volume Bragg gratings in the plurality of volume Bragg gratings can be formed within the single optical block.

The solid transparent volume can be an optical stack that includes a plurality of optical blocks stacked together, and each optical block of the plurality of optical blocks can have at least one of the volume Bragg gratings in the plurality of volume Bragg gratings formed within that optical block.

At least some of the diffraction gratings in the first subset of diffraction gratings can be adapted to transmit a different wavelength.

At least some of the diffraction gratings in the second subset of diffraction gratings can be adapted to transmit a different wavelength.

In an aspect of this disclosure, there is provided a method of routing optical signals in an optical communication system, the method comprising: receiving a first optical signal at a first side of a sequence of diffraction gratings at a first angle of incidence; diffracting, by a first diffraction grating of the sequence of diffraction gratings, the first optical signal based on the first angle of incidence and a first wavelength of the first optical signal, wherein the diffraction gratings of the sequence of diffraction gratings other than the first diffraction grating are transparent to optical signals of the first wavelength received at the first angle of incidence; outputting the first optical signal from a second side of the sequence of diffraction gratings; receiving a second optical signal at a second side of the sequence of diffraction gratings at a second angle of incidence; diffracting, by a second diffraction grating of the sequence of diffraction gratings, the second optical signal based on the second angle of incidence and a second wavelength of the second optical signal, wherein the diffraction gratings of the sequence of diffraction gratings other than the second diffraction grating are transparent to optical signals of the second wavelength received at the second angle of incidence; and outputting the second optical signal from the sequence of diffraction gratings.

The first wavelength and the second wavelength can be different.

The first optical signal can be received from a transmitting unit optically coupled to the first side of the sequence of diffraction gratings; and the first optical signal can be output from the second side of the sequence of diffraction gratings towards an external optical assembly.

The second optical signal can be received from an external optical assembly optically coupled to the second side of the sequence of diffraction gratings; and the second optical signal can be output from the sequence of diffraction gratings towards a receiving unit.

The method can include adjusting an output wavelength of the transmitting unit to a third wavelength, where the third wavelength is different from the first wavelength; transmitting, by the transmitting unit, a third optical signal; receiving the third optical signal at the first side of the sequence of diffraction gratings at the first angle of incidence; diffracting, by a third diffraction grating of the sequence of diffraction gratings, the third optical signal based on the first angle of incidence and the third wavelength of the first optical signal, where the diffraction gratings of the sequence of diffraction gratings other than the third diffraction grating are transparent to optical signals of the third wavelength received at the first angle of incidence; and outputting the third optical signal from the second side of the sequence of diffraction gratings towards the external optical assembly.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

The drawings included herewith are for illustrating various examples of systems, methods, and devices of the present specification and are not intended to limit the scope of what is taught in any way. In the drawings.

Figure 1:
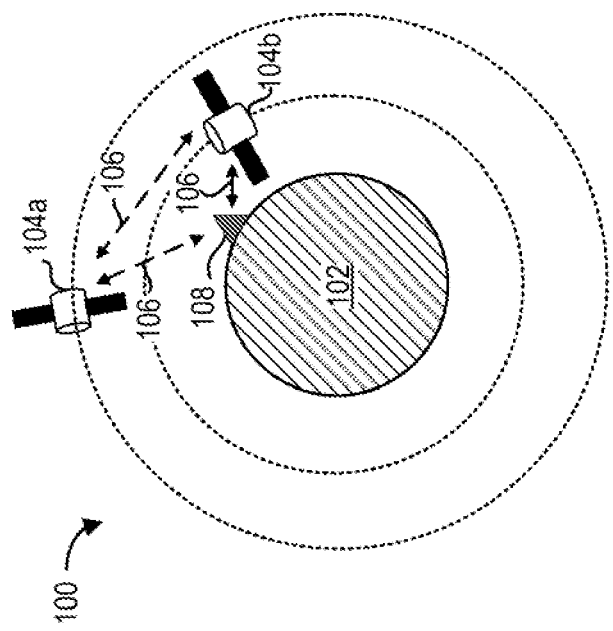
FIG. 1 shows an example environment for a free-space optical (FSO) communication system.

Further aspects and features of the examples described herein will appear from the following description taken together with the accompanying drawings.

DETAILED DESCRIPTION

Various embodiments in accordance with the teachings herein have been described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

It should also be noted that the terms "coupled" or "coupling" as used herein can have several different meanings depending in the context in which these terms are used. For example, the terms coupled or coupling can have a mechanical, fluidic, electrical, or optical connotation. For example, as used herein, the terms coupled or coupling can indicate that two elements or devices can be directly connected to one another or connected to one another through one or more intermediate elements or devices via an electrical or magnetic signal, electrical connection, optical connection, an electrical element, mechanical element or an optical element depending on the particular context. Furthermore coupled electrical elements or optical elements may send and/or receive data.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber or other waveguide), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

Reference is made to FIG. 1, which shows an example environment 100 for a free-space optical (FSO) communication system. FSO communication systems enable communication between various communication terminals including orbiting satellites, ground terminals, airborne terminals, and other terminals (e.g. seaborne terminals). FSO communication systems may often span thousands, or tens of thousands of kilometers.

As shown, FSO systems enable data to be exchanged across air mediums and/or vacuums (e.g., space). For example, FSO communication terminals may be installed on satellites 104a-104b orbiting a ground reference 102 (e.g., earth), ground-based terminals 108 (including mobile and/or stationary ground terminals), airborne objects (e.g. an aircraft such as a plane or drone), and/or other spacecraft. The FSO communication terminals may allow transmission and/or reception of optical signals 106 across vacuums (e.g., space) as between multiple satellites, as well as between satellites 104 and either ground-based terminals 108 (e.g., mobile or stationary) or airborne objects (e.g., an aircraft). FSO links may also be established between various ground-based terminals 108, as well as between ground-based terminals 108 and airborne objects.

Figure 2:
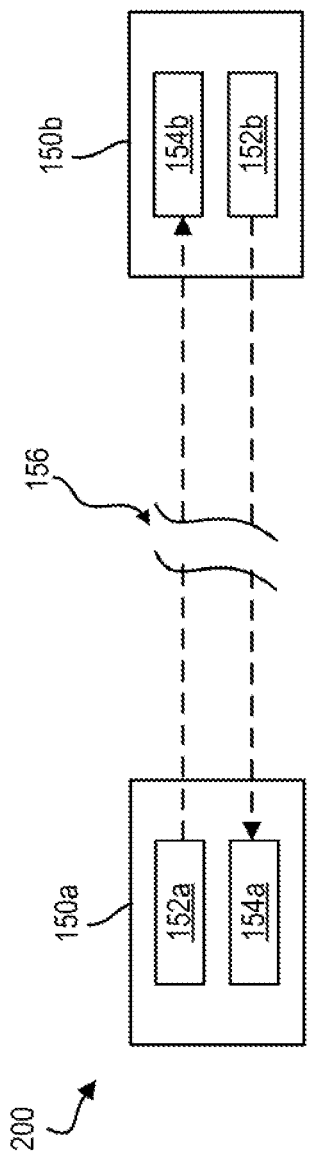
FIG. 2 shows a simplified block diagram of an example free-space optical (FSO) communication link.

FIG. 2 shows a simplified block diagram of an example free space optical (FSO) communication link 200.

As shown, an example optical communication link 200 may include transceivers 150a, 150b. Each transceiver may be located in a separate communication terminal (e.g., satellite, ground-based terminal, etc.). Each transceiver 150a, 150b includes a respective transmitter subsystem 152a, 152b and a respective receiver subsystem 154a, 154b. In this manner, each transceiver 150 may both transmit and receive optical signals over free-space medium 156. Each of the transmitting and receiving subsystem 152, 154 may include a combination of optical mirrors and lenses for directing received and transmitted signals.

While only two transceivers are illustrated in FIG. 2, it will be understood that an FSO communication network can include any number of communicating receivers, transmitters and/or transceivers.

Figure 3A:
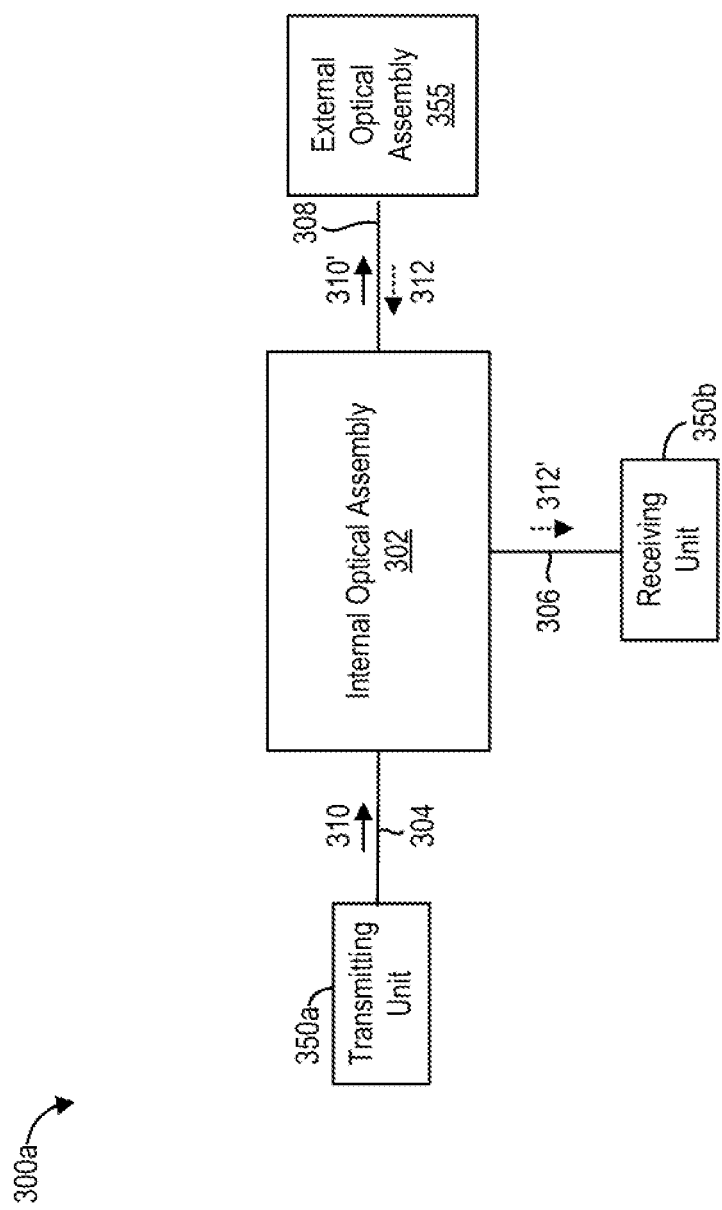
FIG. 3A shows a high-level block diagram for an example optical communication system.

Reference is now made to FIG. 3A, which shows a high-level block diagram for an optical communication system 300a. As shown, the system 300a includes an internal optical assembly 302. The optical assembly 302 is interposed between a transmit signal pathway 304, a receive signal pathway 306 and an external pathway 308. The optical assembly 302 provides high optical isolation between the transmit and receive signal pathways 304, 306.

The optical assembly 302 can be arranged to allow for transmitting and receiving signals having various polarization states, various wavelengths, and using any acquisition and tracking process.

Transmit pathway 304 is connected to transmitting electronics 350a (e.g., electronics generating and modulating a transmitted optical signals 310). Irrespective of the wavelength or linear polarization state of the transmitted signal 310—optical assembly 302 may be configured to internally route these transmitted signals to the external pathway 308. External pathway 308 may, in turn, couple to an external optical assembly 355 (not shown), which is used to transmit the signal 308 to a location external to the optical communications system, i.e., through free space.

Optical assembly 302 may also receive signals 312 via the external pathway 308. The optical assembly 302 can internally route the received signals 312 to the receiving pathway 306, and away from the transmitting pathway 304. The receiving pathway 306 may couple to various receiving electronics 350b which receive and process the signal 312.

While not shown, optical assembly 302 may also route received signals 312' to a pointing, acquisition and tracking (PAT) system. The system can acquire and track the signal by relying either on a beacon at either the communication wavelength or another wavelength, or on a beaconless acquisition and tracking strategy.

The assembly 302 can also be coupled to a controller (not shown), which can configure and/or re-configure various operating parameters of the assembly 302, such as the transmitting unit 350a and/or receiving unit 350b.

A controller may include a processor coupled, via a data bus, to one or more of memory, an input/output (I/O) interface and a communication interface. The processor can be a computer processor, such as a general-purpose microprocessor. Alternatively or in addition, the processor may include a field programmable gate array, application specific integrated circuit, microcontroller, or other suitable computer processor. In some cases, the processor may include multiple processors.

The processor is coupled, via a computer data bus, to memory. Memory may include both volatile and non-volatile memory. Non-volatile memory stores computer programs consisting of computer-executable instructions, which may be loaded into volatile memory for execution by the processor as needed. It will be understood by those of skill in the art that references herein to a controller carrying out a function or acting in a particular way imply that processor is executing instructions (e.g., a software program) stored in memory and possibly transmitting or receiving inputs and outputs via one or more interface. Memory may also store data input to, or output from, processor in the course of executing the computer-executable instructions.

The I/O interface can be used to couple the controller to other external systems and devices, such as to the transmitting electronics in transmitting unit 350a and/or receiving electronics in receiving unit 350b. The communication interface may be any interface that enables reception and transmission of data.

The controller 360 can be used to adjust various operating parameters in the optical assembly 302, such as the wavelength of an optical signal being transmitted by the transmitting unit 350a. The controller may determine the appropriate wavelength for a given optical signal using various techniques. For example, the wavelength range may be simply known in advance by the controller for each partner satellite. For example, the memory may store a database of different wavelength transmission parameters in association with different satellites.

Alternatively or in addition, an initial handshake protocol between two communicating terminals may occur in which the terminal, containing the controller, may determine the transmission and/or reception wavelength of a partner terminal. For example, the initial handshake protocol can be used to establish a communication wavelength from the partner satellite. In other cases, the handshake protocol can enable the partner satellite to simply identify itself, such that the controller can reference the internal database, in memory, to determine the associated transmission wavelength or passband of that satellite. The controller can then vary the receiving electronics to accommodate for the wavelength of the anticipated received signal and/or vary the transmitting unit 350a to adjust the wavelength of the transmitted signal(s). The controller may also then perform a second handshake protocol with another terminal to determine its transmission wavelength, and may again vary the receiving electronics to accommodate for the wavelength of the anticipated received signal from that terminal and/or vary the transmitting unit 350a to adjust the wavelength of the transmitted signal(s) to that terminal, and so forth. In other cases, to enable communication with multiple terminals, the controller may adjust the transmitting and/or receiving electronics to accommodate multiple transmitted and/or received wavelengths for different terminals.

Although the signals 310 and 312 may appear to be substantially parallel when travelling to/from the external optical assembly and to/from free space, it may typically be the case that the transmitted signals 310 and received signals 312 are not exactly parallel. That is, there may be a slight (often very slight) angular offset in the direction of travel of signals 310 and 312. This angular offset can reflect the point ahead angle needed to transmit optical signals between optical communication systems onboard moving objects such as satellites, airborne objects, moving land or sea-based vehicles etc.

As further provided, to enable transmission and reception of optical signals at various wavelengths, the optical assembly 302 can include an optical directional filter. The optical directional filter can be implemented to ensure optical separation between the transmitted signals and the received signals.

Figure 3B:
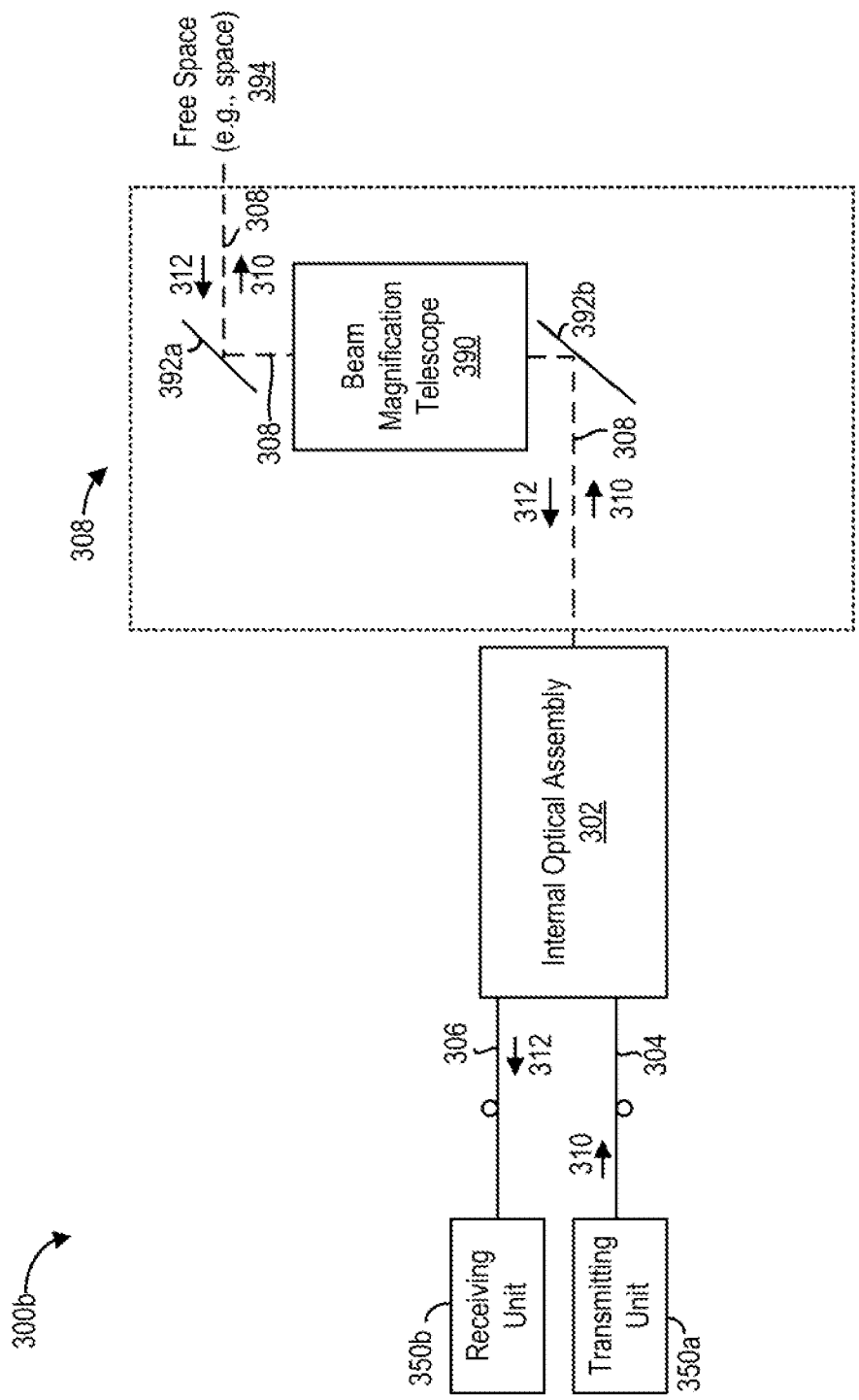
FIG. 3B shows an example FSO communication terminal, which includes an example external optical assembly.

Reference is now made to FIG. 3B, which shows an example FSO communication terminal 300b, which includes various other example components of the external signal pathway 308. The terminal 300b is an example terminal design in which the optical assembly 302 may be installed.

As shown, optical assembly 302 is again interposed between the transmitting signal pathway 304, receiving signal pathway 306 and external signal pathway 308.

External signal pathway 308 may include a series of optical components, including a beam magnification telescope 390. Telescope 390 can include an optical train used to magnify or de-magnify transmitted/received optical signals, so that the signals can propagate over longer distances in free space with the least amount of divergence. Telescope 390 may preferably comprise various mirrors to ensure achromatic performance.

A coarse pointing assembly (CPA) 392a may also, in some example cases, be positioned along the external signal pathway 308. For example, the CPA 392a may be positioned after the telescope 390 and before signals are emitted or received from fee space 394. CPA 392a may be used for coarse pointing of optical signals. A fast steering mirror (FSM) 392b may also be further positioned, along external signal pathway 308. For example, FSM 329b may be positioned between the optical bench assembly 302 and the telescope 390. FSM 392b can be used to correct for higher frequency mechanical jitter.

The external signal pathway 308 (i.e. comprising all optical components), may be designed to be transparent to optical signals with any wavelength and any polarization.

It will be appreciated that various other designs and configurations for the external signal pathway 308 may also be provided.

To cover expansive FSO link distances, a powerful transmit optical signal (e.g., laser) is sent through free space (i.e., via the transmitter 152), and received as a much weaker optical signal at a receiving terminal (i.e., via the respective receiver subsystem 154). In many cases, the transmitted signal power is 70 dB to 90 dB greater than the received optical signal. Accordingly, within a given communication terminal, there is a requirement to prevent the more powerful transmitted signal from overwhelming concurrently received optical signals, and particularly, to otherwise avoid backscattering of the transmitted signal onto the system receiver. Optical isolation between the transmitted and received optical beams can address this problem.

Existing solutions achieve optical isolation between the transmit and receive channels through various schemes that include spatial optical separation, as well as polarization and wavelength multiplexing schemes.

Spatial separation achieves optical isolation through the use of different optical components for the transmit and receive channels. Spatial separation techniques, however, may be expensive as they require double the optical components (i.e., double the cost) for each channel. This also increases the size and weight of the optical components, which can be particularly problematic for systems with size and weight restrictions, such as satellites and airborne objects.

Alternatively, polarization and wavelength multiplexing schemes achieve isolation through the use of different optical polarization states (e.g., orthogonal polarization states), or different wavelengths, for the transmit and receive channels. In this manner, the transmit and receive signals may share the same optical elements, and the optical elements may be selected to separately re-direct the transmit and receive signals based on their incident polarization or wavelength.

Still, existing solutions based on polarization or wavelength multiplexing suffer from important drawbacks. For example, optical elements used in these systems often only accommodate for one type of multiplexing scheme. In turn, these systems may be limited to communication with other terminals configured for the same type of multiplexing scheme.

The effectiveness of polarization separation also requires that the polarization state of the receive channel be well-defined and stable. However, this is rarely the case for many optical communication terminals, particularly space-based optical communication terminals.

Polarization separation can also suffer from self-blinding and feedback if foreign-object debris is present, even in small quantities.

Wavelength selection resolves the issues associated with polarization based separation. However, this introduces challenges in switching between the pre-selected transmit and receive wavelengths. While it is possible to introduce a color wheel (e.g. a moving dichroic filter) to actively select the required wavelengths, this comes with additional cost, mass, electronics and design complexity for the optical communication terminal.

Here, it is recognized that there is a significant benefit to an optical communication terminal capable of communicating using optical signals of any polarization type and/or wavelength. The present disclosure provides for an FSO communication terminal that is capable of optically isolating the receive and transmit pathways while receiving or transmitting using any polarization state, any wavelength and using any acquisition and tracking processes (e.g., beacon-based or beacon-less).

Figure 4A:
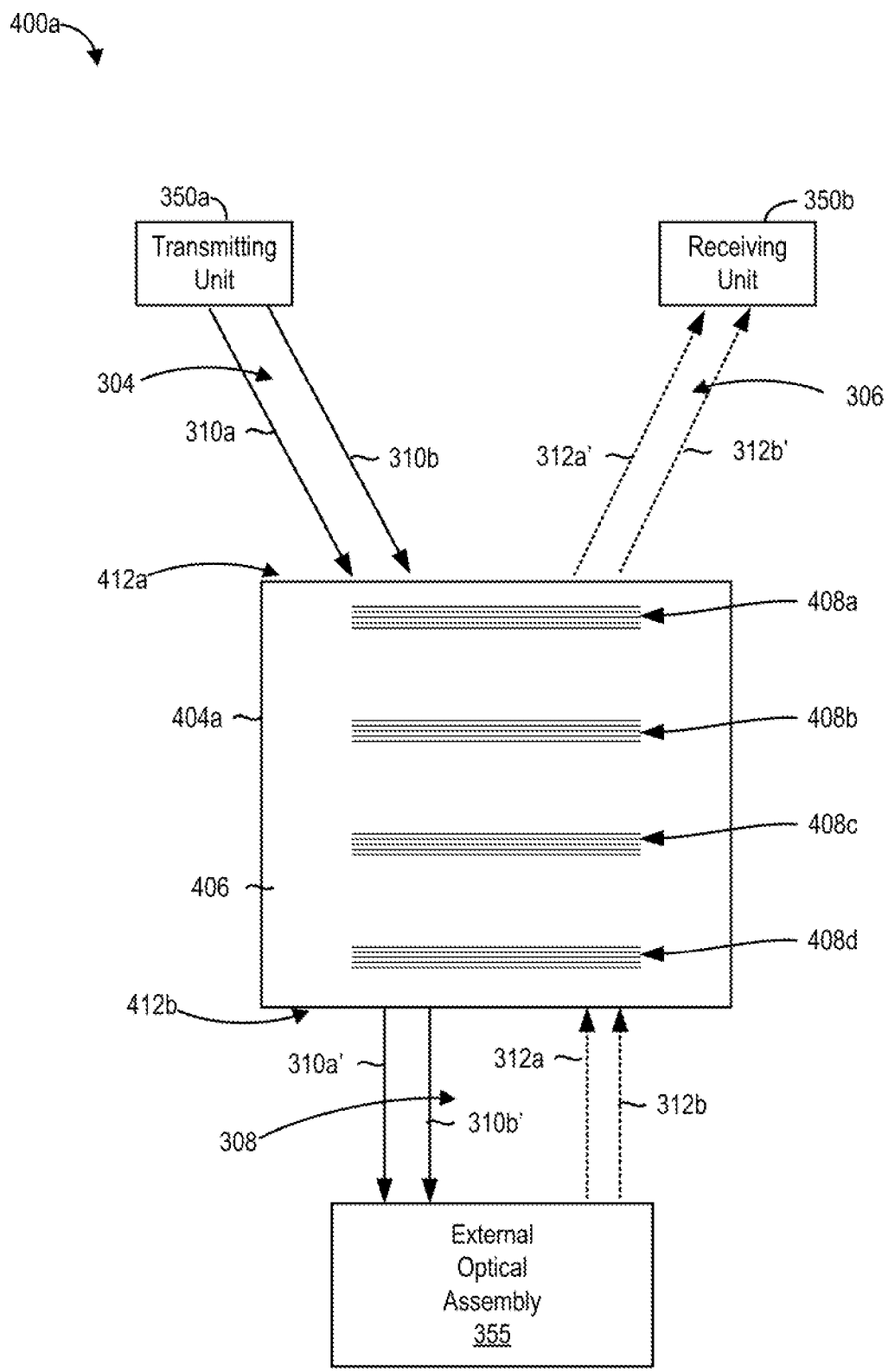
FIG. 4A shows a simplified block diagram of an example optical communication system using volume Bragg gratings.

Referring to FIG. 4A, shown therein is an example optical communication system 400a. The optical communication system 400a includes a transmitting unit 350a coupled to an optical transmitting pathway 304, a receiving unit 350b coupled to an optical receiving pathway 306, and an external optical assembly 355 coupled to an external optical pathway 308. The optical communication system 400a may also include a controller (not shown) as described above with reference to FIG. 3A.

The example optical communication system 400a also includes an optical directional filter 404a interposed between the transmit signal pathway 304, receive signal pathway 306 and external pathway 308. The optical directional filter 404a is arranged to optically isolate the transmitted signals 310a/310b travelling along the transmit pathway 304 from the received signals 312a'/312b' travelling along the receiving pathway 306 while enabling the transmitted signals 310a'/310b' and received signals 312a/312b to travel along the external pathway 308 to/from the external optical assembly 355.

The optical filter 404a can be provided by a sequence of diffraction gratings 408. The diffraction gratings 408 can be defined to selectively diffract incident signals based on the angle at which those signals are incident on the gratings and the wavelength of the incident signals. Each diffraction grating can be defined to diffract a signal that has a specific combination of signal wavelength and incidence angle. The incidence angle is one that falls within a defined angular acceptance range or acceptance cone for that diffraction grating. Typically, the defined angular acceptance range will be on the order of hundreds of micro-radians—typically less than a milliradian).

The plurality of diffraction gratings 408 can be defined to enable bidirectional signal transmission for multiple signal wavelengths. The number of diffraction gratings in the plurality of diffraction gratings can vary depending on the number of different wavelengths that are to be transmitted and received. To enable bidirectional signal transmission for a given signal wavelength, two diffraction gratings can be included (one grating for transmission of that signal wavelength and one grating for receiving that signal wavelength). Each diffraction grating can be defined to be transparent to all optical signals other than optical signals having the specified combination of signal wavelength and incidence angle diffracted by that diffraction grating.

In the example of FIG. 4A, the filter 404a is formed by a solid transparent medium 406 that optically couples the optical transmitting pathway 304 and the optical receiving pathway 306 to the external optical pathway 308. The diffraction gratings are formed as a plurality of volume Bragg gratings 408a-408d (collectively referred to as volume Bragg gratings 408) within the transparent volume 406. As shown, four volume Bragg gratings 408 are formed within the transparent volume 406 (as shown in FIG. 4A) although different and greater numbers of volume Bragg gratings may be used depending on the desired application (see e.g. FIG. 4B).

In general, volume Bragg gratings can be tuned to transmit or reflect different beams on the basis of wavelength (operating as a spectral filter) or angle of incidence (operating as an angular filter). Selective tuning of the volume Bragg gratings 408 can ensure that the transmitted signals 310a/310b travelling along the transmit pathway 304 from transmitting unit 350a to the filter 404a are isolated from the received signals 312a'/312b' travelling along the receiving pathway 306 from the filter 404a to the receiving unit 350b while enabling the transmitted signals 310a'/310b' and received signals 312a/312b to travel along the external pathway 308.

In the example shown in FIG. 4A, the Bragg gratings 408a-408d can be defined to route two different wavelengths of transmitted signals (310a and 310b) and two different wavelengths of received signals (312a and 312b). To provide this signal separation, the volume Bragg gratings 408 can be defined to include a combination of gratings operating as angular filters to provide optical isolation of the transmission and reception channels and spectral filters to separate and merge the different wavelengths being transmitted/received.

The use of diffraction gratings (e.g. a transparent medium 406 with volume Bragg gratings 408) to separate and merge the transmit and receive channels can provide a number of advantages over existing approaches. In particular, the filter 404a may provide a significant mass savings as it can be implemented as a single optical block (e.g. either a unitary medium or a set of transparent mediums stacked or laminated together with volume Bragg gratings former therein) that occupies a minimal footprint within the communication system. For example, the signal aperture at each optical input/output of the transparent medium may be at most 2-3 times the beam diameter of signals being transmitted and/or received.

The filter 404a also enables the transmit and receive channels to be merged and separated without any moving parts to provide the filter. That is, the filter 404a can be fixed in place within the optical assembly (interposed between the pathways 304, 306 and 308) once it has been installed.

The filter 404a is also a static filter in that its components are pre-defined/pre-tuned to separate the transmit/receive pathways. That is, no electronics or other control components are necessary for the filter 404a to perform signal separation.

Furthermore, adjusting the transmission and receiving wavelength can be performed without any moving optical components. That is, changing the transmission wavelength and/or receiving wavelength can be performed by electronically adjusting the transmitting unit 350a (e.g. adjusting the wavelength emitted by a laser or activating an alternative transmission laser) and/or receiving unit 350b e.g. using a controller.

The filter 404a also enables the transmit and receive channels to be merged and separated without using polarization separation. This allows for greater interoperability and communication with a larger number of other communication terminals.

The transparent medium 406 can be formed using various types of well transparent materials (e.g. materials with low absorption and scattering losses) where the refractive indices can be modified to generate a bulk refractive grating. Examples of materials that may be used for the transparent medium 406 include glass materials (e.g. fused silica) and transparent crystalline materials. The transparent medium 406 can be formed as a solid geometric volume, e.g. a cube or parallelepiped.

The volume Bragg gratings 408 can be written into the interior volume of the medium 406 (i.e. not on the surface of the medium 406) in the form of a volume holographic grating. Each volume Bragg grating 408 can be formed by creating periodic layers of high and low refractive indices within the medium 406 (i.e. a periodic change or modulation in the refractive index of the medium 406).

For example, a photosensitive (photorefractive) glass volume (e.g. silica containing some dopants) can be irradiated with ultraviolet light in the spatial shape of a standing wave pattern over a given time interval. This can involve superimposing two narrow-linewidth ultraviolet light beams in the material with different propagation directions. The angle between the two beams, together with the optical wavelength and the refractive index of the glass, can define the period of the obtained interference pattern.

Alternatively, the volume Bragg gratings can be generated using direct laser writing techniques. The transparent volume can be exposed to tightly focused ultrashort (e.g. femtosecond) laser pulses with high peak intensities to generate the desired patterns.

Additional optional manufacturing steps may be used to avoid parasitic reflections (e.g. polishing, anti-reflection coatings etc.).

In filter 404a, the plurality of volume Bragg gratings 408 can be tuned to define a reciprocal directional filter for optical signals passing through the volume 406. The volume Bragg gratings 408 can be selected to selectively transmit optical signals based on the angle of incidence at which those optical signals are received. In particular, the plurality of volume Bragg gratings 408 can include a first subset of volume Bragg gratings 408 adapted to transmit transmitted signals 310a/310b from the transmitting unit 350a to the external optical assembly unit 355 and a second subset of volume Bragg gratings 408 adapted to transmit received signals 312a/312b from the external optical assembly 355 to the receiving unit 350b. The volume Bragg gratings 408 can be positioned within the medium to provide for the desired selective transmission of the transmitted and received signals.

The transmitting unit 350a can be arranged to transmit the transmitted signals 310a/310b to the transparent volume 404a at a first angle of incidence. The volume Bragg gratings 408 can be defined to transmit optical signals received at the first side 412a of the volume 404a at the first angle of incidence to the external pathway 308. The volume Bragg gratings 408 can also be selected to prevent signals received at the first side 412a at other incident angles from passing through to the external pathway 308. The volume Bragg gratings 408 can be defined to provide a narrow angular range of incident optical signals that are transmitted through the first side 412a while substantially all other signals are reflected.

The external optical assembly 355 can be arranged to transmit the received signals 312a/312b to the transparent volume 404a at a second angle of incidence. The volume Bragg gratings 408 can be defined to transmit optical signals received at the second side 412b of the volume 404a at the second angle of incidence to the receiving pathway 306. Optionally, the second angle of incidence can be different from the first angle of incidence.

The volume Bragg gratings 408 can also be selected to prevent signals received at the second side 412b at other incident angles from passing through to the receiving pathway 306. The volume Bragg gratings 408 can be defined to provide a narrow angular range of incident optical signals that are transmitted through the second side 412b while substantially all other signals are reflected. This can prevent backscattering of the transmitted signals 310a'/310b' from travelling along the receiving pathway 306 and interfering with the received signals 312a'/312b'.

For example, the first subset of Bragg gratings may include a first grating 408a and a second grating 408b. The first grating 408a can be defined to diffract signals 310a of a first wavelength received at a first angle of incidence while being transparent to other signals 310b and 312a/312b and the second grating 408b can be defined to diffract transmitted signals 310b of a second wavelength received at the first angle of incidence while being transparent to other signals 310a and 312a/312b.

The second subset of Bragg gratings may include a third grating 408c and a fourth grating 408d. The third grating 408c can be defined to diffract received signals 312a of the first wavelength received at a second angle of incidence while being transparent to other signals 310a/310b and 312b; and the fourth grating 408d can be defined to diffract received signals 312b of the second wavelength received at the second angle of incidence while being transparent to other signals 310a/310b and 312a. As should be appreciated, the order/numbering (e.g. first, second, third etc.) of the gratings 408 is merely exemplary and different sequences of gratings may be used to provide the same filtering operation.

For example, in operation, a first optical signal (e.g. 310a) can be received at a first side 412a of a sequence of diffraction gratings at a first angle of incidence. The first optical signal can be diffracted by a first diffraction grating (e.g. grating 408a) of the sequence of diffraction gratings based on the first angle of incidence and a first wavelength of the first optical signal. As noted above, the diffraction gratings (408b-408d) of the sequence of diffraction gratings other than the first diffraction grating 408a can be transparent to optical signals of the first wavelength received at the first angle of incidence. The first optical signal 310a' can then be output from the second side 412b of the sequence of diffraction gratings.

A second optical signal 312a can be received at the second side 412b of the sequence of diffraction gratings at a second angle of incidence. The second optical signal can be diffracted by a second diffraction grating (e.g. 408c or 408d) of the sequence of diffraction gratings based on the second angle of incidence and a second wavelength of the second optical signal. Again, the diffraction gratings of the sequence of diffraction gratings other than the second diffraction grating can be transparent to optical signals of the second wavelength received at the second angle of incidence. Where the second wavelength is different from the first wavelength, the second diffraction grating can be grating 408d. The second optical signal 312a' can then be output from the first side 412a of the sequence of diffraction gratings.

In operation, the controller may further operate to adjust an output wavelength of the transmitting unit 350a to a third wavelength, where the third wavelength is different from the first wavelength. The transmitting unit 350a can then transmit a third optical signal 310b which is received at the first side 412a of the sequence of diffraction gratings at the first angle of incidence. The third optical signal can be diffracted by a third diffraction grating (e.g. grating 408b) of the sequence of diffraction gratings based on the first angle of incidence and the third wavelength of the first optical signal. Again, the diffraction gratings of the sequence of diffraction gratings other than the third diffraction grating can be defined to be transparent to optical signals of the third wavelength received at the first angle of incidence. The third optical signal can then be output from the second side 412b of the sequence of diffraction gratings towards the external optical assembly 355.

The receiving pathway 306 and transmitting pathway 304 can be angularly spaced apart to ensure separation between the optical signals along the respective pathways. The particular angular separation between the receiving pathway 306 and transmitting pathway 304 can vary depending on the constraints of a given implementation. Optionally, the pathways 304 and 306 may be spaced apart by an angle of at least 45 degrees. Optionally, the pathways 304 and 306 may be spaced apart by an angle of about 90 degrees (i.e. the optical transmitting pathway may be substantially perpendicular to the optical receiving pathway) or more. The particular angular spacing between the receiving pathway 306 and transmitting pathway 304 can be defined or accommodated by defining the diffraction gratings to reflect the optical signals in different directions, e.g. by reflecting the received signals 312a/312b in a direction angularly offset from the transmitting pathway 304.

Optionally, the filter 404a may also be defined to enable wavelength multiplexing for the transmit and receiving channels. Accordingly, one or more of the Bragg gratings 408 can also be defined and arranged within the volume 406 so as to separate different wavelengths of signals. At least some of the first subset of Bragg gratings (the gratings defined to transmit the transmitted signals) can be adapted to transmit different wavelength. This can allow for transmission channels of different wavelengths to be transmitted concurrently and thereby increase the transmission bandwidth of the communication terminal.

Alternatively or in addition, least some of the second subset of Bragg gratings (the gratings defined to transmit the received signals) can be adapted to transmit different wavelength. This can allow for channels of different wavelengths to be received and separately routed concurrently and thereby increase the reception bandwidth of the communication terminal.

Alternatively or in addition, different wavelengths may be selected by adjusting the transmitting unit 305a and/or receiving unit 350b. This may be particularly desirable where size or mass constraints do not allow for multiple transmission or receiving signals to be transmitted concurrently.

Figure 4B:
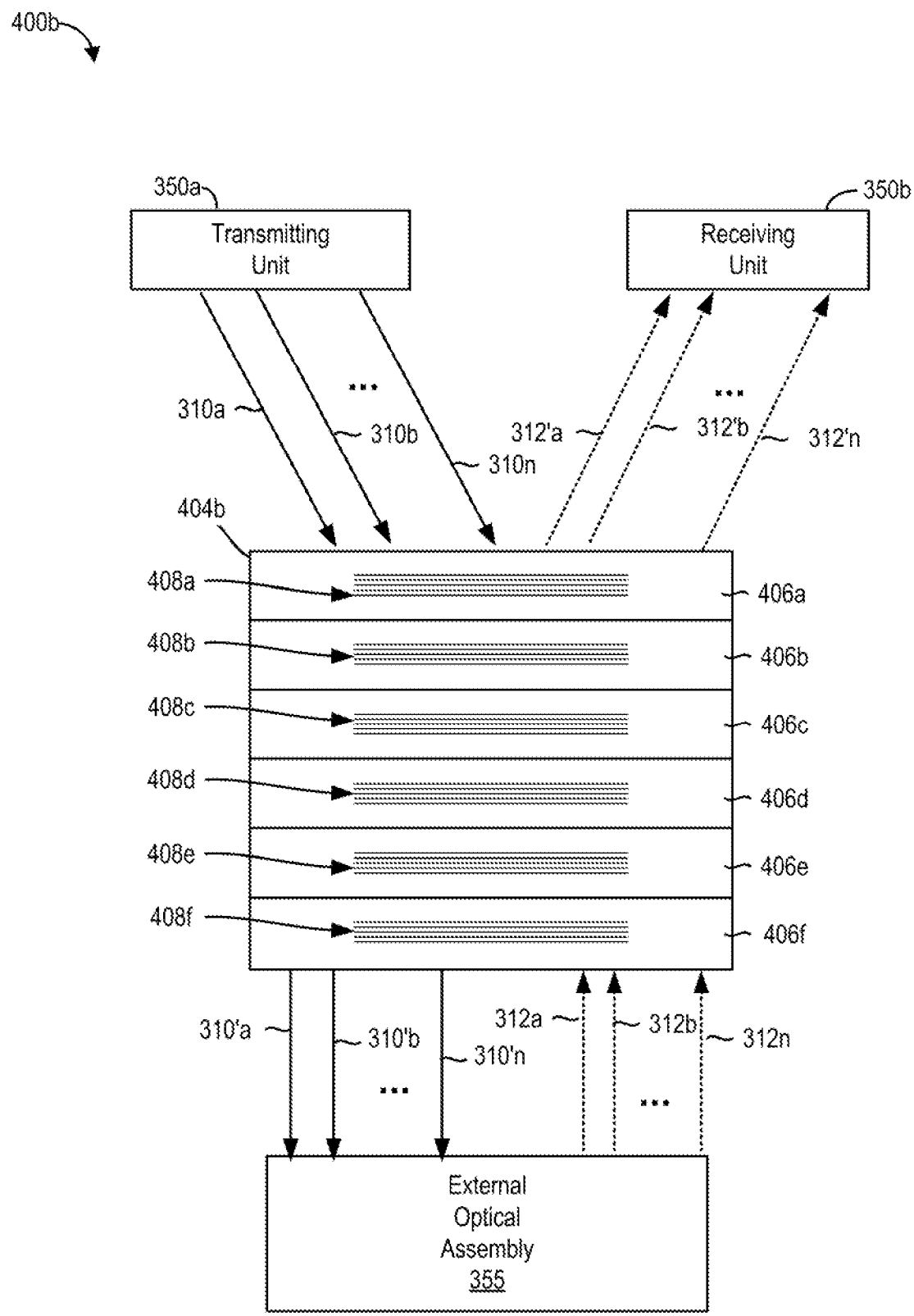
FIG. 4B shows a simplified block diagram of another example optical communication system using volume Bragg gratings.

Referring to FIG. 4B, shown therein is another example optical communication system 400b. Similar to optical communication system 400a, the optical communication system 400b includes a transmitting unit 350a coupled to an optical transmitting pathway 304, a receiving unit 350b coupled to an optical receiving pathway 306, and an external optical assembly 355 coupled to an external optical pathway 308.

In the example shown in FIG. 4A, the optical filter 404a is formed by a single transparent volume 406 within which multiple Bragg gratings 406a-406d are formed. That is, the solid transparent volume 406 in FIG. 4A is a single optical block and all of the volume Bragg gratings 408 in the plurality of volume Bragg gratings 408 are formed within that single optical block.

By contrast, in system 400b, the optical filter 404b is formed by an optical stack that includes a plurality of optical blocks 406a-406f stacked together. Each optical block 406 of the plurality of optical blocks has at least one of the volume Bragg gratings 408 in the plurality of volume Bragg gratings 408 formed within that optical block 406. Collectively, the optical blocks 406a-406f define a solid transparent volume through which signals can be selectively transmitted by the volume Bragg gratings 408.

As explained above, system 400a includes an optical filter 404a with a set of four volume Bragg gratings 408a-408d that are capable of separating and merging the transmission and reception channels for two different wavelengths of transmitted signals. System 400b allows for more than two reception channels using an increased number of Bragg gratings 408a-f to allow for more than two different wavelengths of transmitted signals thereby increasing the operational bandwidth of the system 400b. As will be appreciated, the number and arrangement of gratings 408 can be adjusted to accommodate a desired operational bandwidth.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An optical communication system comprising:
    a transmitting unit coupled to an optical transmitting pathway;
    a receiving unit coupled to an optical receiving pathway;
    an external optical assembly unit coupled to an external optical pathway; and
    a sequence of diffraction gratings coupling the optical transmitting pathway and the optical receiving pathway to the external optical pathway, wherein the sequence of diffraction gratings comprises a plurality of diffraction gratings, wherein the plurality of diffraction gratings comprises a first subset of diffraction gratings adapted to transmit a transmitted signal received at a first side of the sequence from the transmitting unit through a second side of the sequence to the external optical assembly unit and a second subset of diffraction gratings adapted to transmit a received signal received at the second side of the sequence from the external optical assembly to the receiving unit.

2. The optical communication system of claim 1, wherein the plurality of diffraction gratings are fixed in position between the transmitting unit, the receiving unit, and the external optical assembly unit.

3. The optical communication system of claim 1, wherein:
    the transmitting unit is arranged to transmit the transmitted signal to the first side of the sequence of diffraction gratings at a first angle of incidence; and
    the external optical assembly is arranged to transmit the received signal to the second side of the sequence at a second angle of incidence, the second angle of incidence being different from the first angle of incidence.

4. The optical communication system of claim 1, wherein the optical transmitting pathway is offset from the optical receiving pathway by at least 45 degrees.

5. The optical communication system of claim 1, wherein at least some of the diffraction gratings in the first subset of diffraction gratings are adapted to transmit a different wavelength.

6. The optical communication system of claim 1, wherein at least some of the diffraction gratings in the second subset of diffraction gratings are adapted to transmit a different wavelength.

7. The optical communication system of claim 1, wherein the plurality of diffraction gratings comprises a plurality of volume Bragg gratings and the plurality of volume Bragg gratings are formed within a solid transparent volume interposed between the optical transmitting pathway, the optical receiving pathway and the external optical pathway.

8. The optical communication system of claim 7, wherein the solid transparent volume comprises a single optical block and all of the volume Bragg gratings in the plurality of volume Bragg gratings are formed within the single optical block.

9. The optical communication system of claim 7, wherein the solid transparent volume comprises an optical stack that includes a plurality of optical blocks stacked together, and each optical block of the plurality of optical blocks has at least one of the volume Bragg gratings in the plurality of volume Bragg gratings formed within that optical block.

10. An optical directional filter for an optical communications system, the filter comprising:
    a sequence of diffraction gratings, wherein the sequence of diffraction gratings comprises a plurality of diffraction gratings, wherein the plurality of diffraction gratings comprises:
    a first subset of diffraction gratings adapted to transmit a transmitted signal from a transmitting unit to an external optical assembly unit according to a first angle of incidence of the transmitted signal; and
    a second subset of diffraction gratings adapted to transmit a received signal from the external optical assembly to a receiving unit according to a second angle of incidence of the received signal;
    wherein the first angle of incidence is different from the second angle of incidence.

11. The optical directional filter of claim 10, wherein the plurality of diffraction gratings comprises a plurality of volume Bragg gratings and the plurality of volume Bragg gratings are formed within a solid transparent volume.

12. The optical directional filter of claim 11, wherein the solid transparent volume comprises a single optical block and all of the volume Bragg gratings in the plurality of volume Bragg gratings are formed within the single optical block.

13. The optical directional filter of claim 12, wherein the solid transparent volume comprises an optical stack that includes a plurality of optical blocks stacked together, and each optical block of the plurality of optical blocks has at least one of the volume Bragg gratings in the plurality of volume Bragg gratings formed within that optical block.

14. The optical directional filter of claim 10, wherein at least some of the diffraction gratings in the first subset of diffraction gratings is adapted to diffract a different wavelength.

15. The optical directional filter of claim 10, wherein at least some of the diffraction gratings in the second subset of diffraction gratings is adapted to diffract a different wavelength.

16. A method of routing optical signals in an optical communication system, the method comprising:
receiving a first optical signal at a first side of a sequence of diffraction gratings at a first angle of incidence;
diffracting, by a first diffraction grating of the sequence of diffraction gratings, the first optical signal based on the first angle of incidence and a first wavelength of the first optical signal, wherein the diffraction gratings of the sequence of diffraction gratings other than the first diffraction grating are transparent to optical signals of the first wavelength received at the first angle of incidence;
outputting the first optical signal from a second side of the sequence of diffraction gratings;
receiving a second optical signal at a second side of the sequence of diffraction gratings at a second angle of incidence;
diffracting, by a second diffraction grating of the sequence of diffraction gratings, the second optical signal based on the second angle of incidence and a second wavelength of the second optical signal, wherein the diffraction gratings of the sequence of diffraction gratings other than the second diffraction grating are transparent to optical signals of the second wavelength received at the second angle of incidence; and
outputting the second optical signal from the sequence of diffraction gratings.

17. The method of claim 16, wherein the first wavelength and the second wavelength are different.

18. The method of claim 16, wherein:
the first optical signal is received from a transmitting unit optically coupled to the first side of the sequence of diffraction gratings; and
the first optical signal is output from the second side of the sequence of diffraction gratings towards an external optical assembly.

19. The method of claim 16, wherein:
the second optical signal is received from an external optical assembly optically coupled to the second side of the sequence of diffraction gratings; and
the second optical signal is output from the sequence of diffraction gratings towards a receiving unit.

20. The method of claim 18, further comprising:
adjusting an output wavelength of the transmitting unit to a third wavelength, wherein the third wavelength is different from the first wavelength;
transmitting, by the transmitting unit, a third optical signal;
receiving the third optical signal at the first side of the sequence of diffraction gratings at the first angle of incidence;
diffracting, by a third diffraction grating of the sequence of diffraction gratings, the third optical signal based on the first angle of incidence and the third wavelength of the first optical signal, wherein the diffraction gratings of the sequence of diffraction gratings other than the third diffraction grating are transparent to optical signals of the third wavelength received at the first angle of incidence; and
outputting the third optical signal from the second side of the sequence of diffraction gratings towards the external optical assembly.

* * * * *